United States Patent

Kling

[19]

[11] Patent Number: 5,996,545
[45] Date of Patent: Dec. 7, 1999

[54] INTERNAL COMBUSTION ENGINE WITH A HORIZONTAL CYLINDER

[75] Inventor: Juergen Kling, Wiernsheim, Germany

[73] Assignee: Ing. h.c.F. Porsche AG, Weissach, Germany

[21] Appl. No.: 09/034,609

[22] Filed: Mar. 3, 1998

[30] Foreign Application Priority Data

Mar. 5, 1997 [DE] Germany ............................ 197 08 892

[51] Int. Cl.⁶ ..................................................... F02F 1/00
[52] U.S. Cl. ........................ 123/193.6; 277/445; 277/457
[58] Field of Search ............................ 123/193.6, 193.4; 277/435, 445, 457

[56] References Cited

U.S. PATENT DOCUMENTS

| | | | |
|---|---|---|---|
| 3,336,844 | 8/1967 | Cornet | 277/457 |
| 3,831,952 | 8/1974 | Geffroy | 277/457 |
| 4,856,417 | 8/1989 | Ishikawa | 123/193.6 |
| 5,203,294 | 4/1993 | Takemura et al. | 277/445 |
| 5,476,076 | 12/1995 | Zhou | 123/193.4 |
| 5,655,433 | 8/1997 | Santi | 123/193.6 |

FOREIGN PATENT DOCUMENTS

| | | |
|---|---|---|
| 0 351 976 | 1/1990 | European Pat. Off. . |
| 719 659 | 2/1932 | France . |
| 25 42 803 | 4/1976 | Germany . |

OTHER PUBLICATIONS

Ing. E. Strasser: "Kolbengestaltung Fuehr Niedrigen Olverbrauch", May 17, 1979, pp. 1–11.

P. DE K. Dykes, "Pressure–Packed Piston Rings", The Motor Industry Research Association, Brentford, Middlesex; Dec. 1, 1951, pp. 1–22.

*Primary Examiner*—John Kwon
*Attorney, Agent, or Firm*—Evenson, McKeown Edwards & Lenahan, PLLC

[57] ABSTRACT

In order to prevent penetration of lubricant into the combustion chamber, a piston for an internal combustion engine has a labyrinthine pressure equalizing passage between the combustion chamber and the crankcase. For this purpose, the piston ring closest to the combustion chamber is guided with relatively large axial play in the matching annular groove. The piston rings located farther from the combustion chamber are each provided with recesses that connect the annular chamber between the adjacent piston rings with the bottom of the respective annular groove. A bore is also provided in the annular groove that is farthest from the combustion chamber, the bore connecting the bottom of the annular groove with an interior chamber defined in the piston. In this way, the pressure can equalize between the combustion chamber and the crankcase.

20 Claims, 2 Drawing Sheets

INTERNAL COMBUSTION ENGINE WITH A HORIZONTAL CYLINDER

BACKGROUND AND SUMMARY OF THE INVENTION

This application claims the priority of 197 08 892.9 filed Mar. 5, 1997, the disclosure of which is expressly incorporated by reference herein.

The invention relates to an internal combustion engine with at least one cylinder whose cylinder axis extends at least approximately horizontally in the installed position.

An internal combustion engine of this type is known from German patent document DE 25 42 803 C2. In order to avoid the development of a large quantity of smoke when starting the engine, which depends on certain conditions (piston position, alignment of the engine and/or the vehicle at rest, temperature of the engine when shut off), it is known from DE 25 42 803 to provide recesses on the piston ring grooves that extend to the bottom of the groove and form a labyrinthine passage connected with the interior of the piston by a bore in the groove facing away from the combustion chamber. These recesses allow equalization of the pressure in the combustion chamber, which is a function of the piston position, and the ambient pressure in the crankcase. This passage prevents a pressure that prevails in the combustion chamber of the shutoff engine, said pressure being lower than the ambient pressure, being maintained for a long time after the engine is shut off, and resulting in lubricant being drawn into the combustion chamber. This lubricant that enters the combustion chamber is burned when the engine is restarted and produces an increased amount of smoke. Providing recesses in all the piston ring grooves, however, entails considerable expense. Very precise machining with low tolerances is required, particularly in the area of the first piston ring groove facing the combustion chamber, because of the high loads involved. If such a recess is formed in the first piston ring groove after the surface of the ring has been finished, there is an increased danger of formation of burrs at the transition from the recess to the edge of the ring groove. If on the other hand the ring groove is finished after the recess has been formed, the familiar machining problems caused by the open machining surface at the edge of the recess will result. In addition, such a recess in the vicinity of the first piston ring facing the combustion chamber leads to an undesired increase in blow-by gas flow. In addition, the part of the recess of the first piston ring groove that faces the combustion chamber during operation of the internal combustion engine has a tendency to become clogged by combustion residues. The desired reduction of the amount of oil drawn into the combustion chamber is therefore impeded after the engine has been operating for a while, while at the same time a significant increase in blow-by gas flow persists as a result of the recess on the first piston ring that faces away from the combustion chamber.

Hence there is a need for improvements in an engine having at least one cylinder aligned horizontally in the installation position of the engine such that reduction of blue smoke on starting is achieved at limited machining expense, while at the same time a blow-by gas flow is maintained that is as low as possible.

This and other needs have been met according to the present invention by providing an internal combustion engine, comprising: at least one cylinder having a cylinder axis extending at least approximately horizontally in the installed position, a piston defining at least three annular grooves along an outer circumference and defining an interior chamber; a piston ring disposed in each of the annular grooves, respectively, each piston ring having an at least approximately rectangular cross section, annular chambers being defined between the piston and the cylinder between adjacent ones of the piston rings, recesses being defined in the piston adjacent at least two of the annular grooves, each said recess extending between a bottom of the respective annular groove and the outer circumference of the piston and communicating with one of said annular chambers, at least one bore defined in the piston between the bottom of the annular groove located remote from a combustion chamber and the interior chamber of the piston, the annular groove closest to the combustion chamber being free of recesses, an axial play between the annular groove closest to the combustion chamber and the piston ring disposed therein being at least 50 µm.

This and other needs have also been met according to the present invention by providing a piston for a horizontal cylinder of an internal combustion engine, said piston comprising: a piston bottom to be faced to a combustion chamber of the engine; a piston body integral with said piston bottom and extending in an axial direction from said piston bottom, an interior of said piston body and said piston bottom defining an interior chamber; at least three annular grooves being defined in said piston body extending circumferentially around the piston, a first of said annular grooves located nearest said piston bottom having a constant cross-section in said axial direction throughout, said first annular groove being dimensioned to receive a piston ring with an axial play between the piston ring and the first annular groove of at least 50 µm, a second and a third of said annular grooves located further from said piston bottom having a cross-section which varies in said axial direction at recesses extending from an outer circumference of said piston to a bottom of said annular grooves, at least one bore defined in the piston communicating the annular groove located furthest from the piston bottom with the interior chamber.

By designing the first piston ring groove (closest to the combustion chamber) without a recess, the seal between the combustion chamber relative to the prior art is improved so that the blow-by gas flow is significantly reduced. At the same time, the tuned geometry of the piston ring and the axial play, which is relatively large by comparison to conventional piston ring geometries, permit pressure equalization between the combustion chamber and the annular chamber between the first and second piston rings. The second and third piston ring grooves can then be provided with recesses without a significant increase in blow-by gas flow, forming a labyrinthine passage connected by bores between the bottom of one of the annular grooves facing away from the combustion chamber and the interior of the piston. With this design of the piston rings and piston ring grooves, the machining cost for the piston is significantly reduced. In particular, the first piston ring groove that is subjected to very high stress can be machined completely without costly edge machining processes being required.

If recesses are formed in a piston ring groove on both sides of the piston ring, these recesses can advantageously be located opposite one another, simplifying machining because both recesses can be produced by a common drilling and/or grinding process for example.

Possible penetration of lubricant into the combustion chamber is prevented especially effectively when the second piston ring from the combustion chamber is prevented from twisting. This ensures that the face of the piston ring is always uppermost. The lower area over which the piston travels is therefore reliably sealed off so that penetration of lubricant along the lower wall is effectively prevented when the cylinder is inclined.

Such protection against twisting can be achieved in an especially advantageous manner by initially bending portions of one of the two ring faces in the axial or radial direction, with the bent section then cooperating with a recess in the annular groove that receives the piston ring.

Other objects, advantages and novel features of the present invention will become apparent from the following detailed description of the invention when considered in conjunction with the accompanying drawings.

DETAILED DESCRIPTION OF THE DRAWINGS

Figure 1:
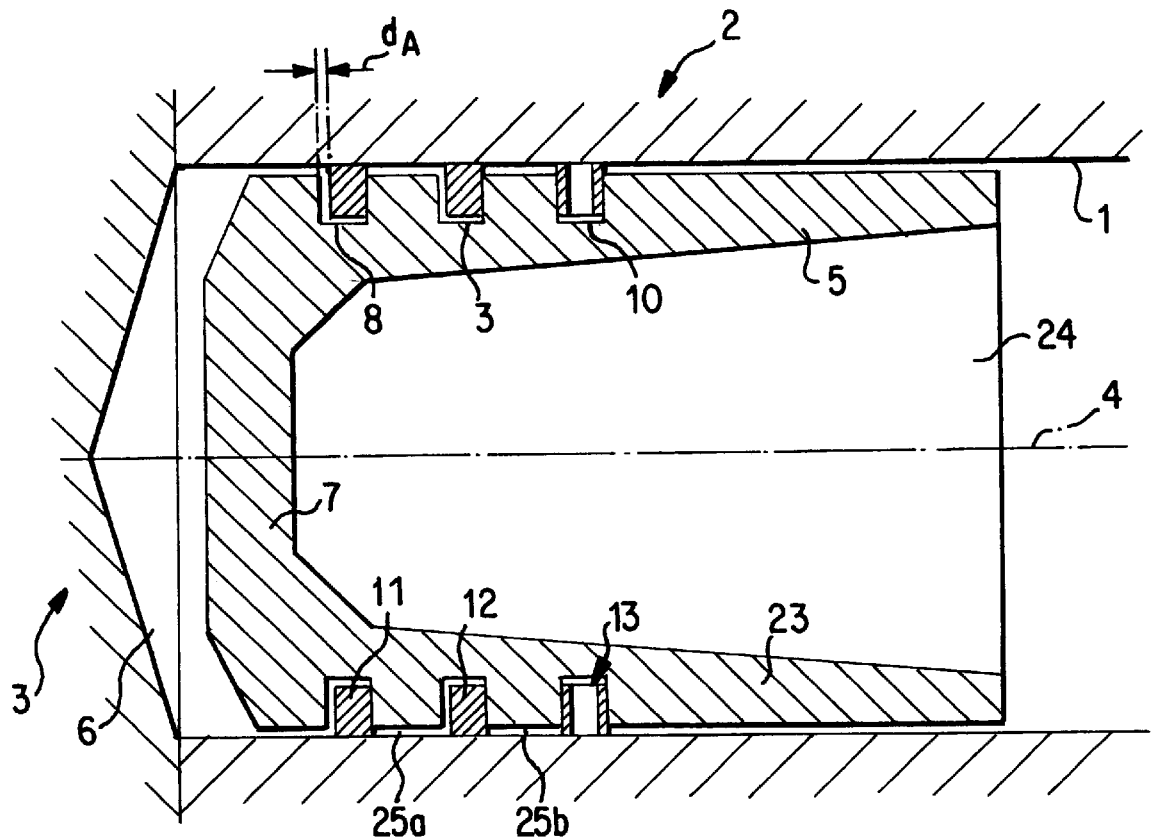
FIG. 1 is a schematic lengthwise section through a cylinder of an internal combustion engine according to a preferred embodiment of the present invention.

FIG. 1 shows in simplified form a cylinder 1 of an internal combustion engine, said cylinder being located in a cylinder block 2 and sealed off at one end by a cylinder head 3. The engine is aligned so that cylinder axis 4 is directed at least approximately horizontally with the engine in the installed position, i.e. the angle between the cylinder axis and the horizontal is less than 20 degrees for example. A cup-shaped piston 5 is guided axially movably inside cylinder 1. Three circumferential annular grooves are formed at the circumference of piston 5, said grooves being numbered from piston bottom 7 and cylinder head 2, starting at combustion chamber 6, as first annular groove 8, second annular groove 9, and third annular groove 10. Piston rings 11 to 13 are located in each of the three annular grooves 8 to 10, the exterior of each of said piston rings abutting the cylinder wall. The third piston ring 13 in the third annular groove 10 located furthest from the combustion chamber of the three piston rings is designed as a three-part oil wiper ring known of itself. First and second piston rings 11 and 12 are each made in one piece and guided with limited axial and radial play in their respective annular grooves 8 and 9. The axial play $d_A$ of the first piston ring 8 (close to the combustion chamber) is relatively large by comparison with conventional internal combustion engines and/or pistons and is approximately between 50 and 120 µm.

Two opposite recesses 16 and 17 are formed in lateral surfaces 14 and 15 of second annular groove 9, said recesses each extending from the circumference of the piston to the bottom 18 of the annular groove. These recesses 16 and 17 can be formed for example by drilling or grinding in the radial direction. Recesses 16 and 17 are dimensioned so that they project approximately 2/10 mm into lateral surfaces 14 and 15. In contrast to the embodiment shown here, it is also possible to locate recesses 16 and 17 so that they are not opposite one another but are staggered with respect to one another.

Another recess 20 is provided in third annular groove 10, said recess being located in side area 19 toward to the combustion chamber. This recess 20 also extends to the bottom 21 of annular groove 10. A bore 22 extends radially into bottom 21 of annular groove 10, said bore penetrating piston wall 23 and forming a connection to interior chamber 24 of the piston. Bore 22 in this embodiment is located so that it is in the vicinity of recess 20. An offset arrangement of bore 22 with respect to recess 20 is also possible. The bore can then also project partially beyond the annular groove and thus form a recess itself. It is also possible to make the bore sufficiently large and to locate it so that it projects beyond the annular groove on both sides of the latter. In this way, two opposite recesses are created simultaneously when the bore is formed.

Bottom 18 of annular groove 9 is connected with annular chamber 25a by recess 16. This annular chamber 25a is delimited in the axial direction by the two adjacent piston rings 11 and 12 and in the radial direction by the cylinder wall and by piston wall 23. Annular chamber 25b, formed in similar fashion between the second and third piston rings, is connected by recess 17 with bottom 18 of annular groove 9 and by recess 20 with bottom 21 of annular groove 10.

Figure 2:
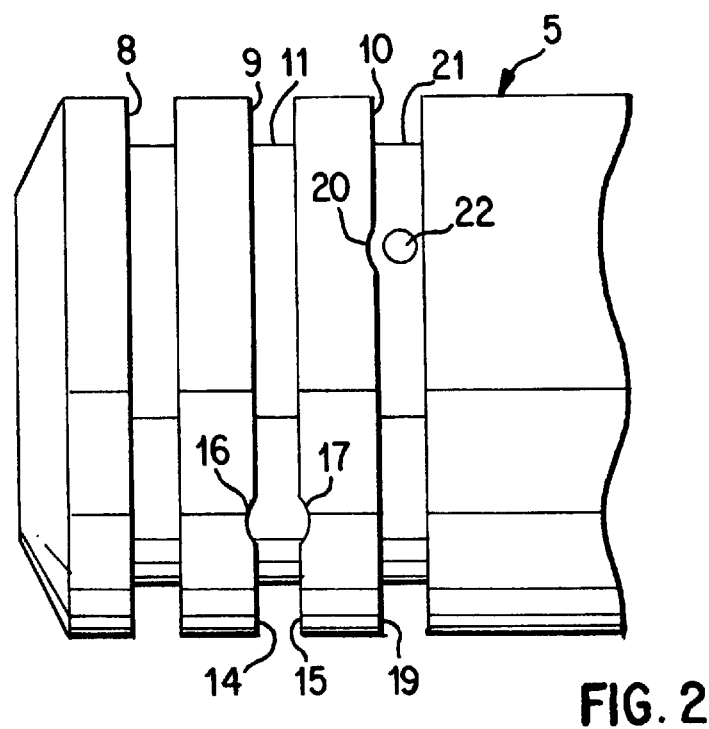
FIG. 2 is a schematic top view of the piston of FIG. 1.

As a result of the relatively large amount of axial play of first piston ring 11 in conjunction with first annular groove 8 and because of recesses 16, 17, and 20, after the engine is shut off the pressure can equalize between combustion chamber 6 and the crankcase of the engine, not shown, through bore 22 and interior chamber 24. This labyrinthine passage simultaneously prevents lubricant from flowing into the combustion chamber. This is especially true when recesses 16 and 17 of middle annular groove 19 are located at a distance from the lower cylinder wall relative to the installation position. For this purpose, these recesses can be located above a horizontal plane that runs through the cylinder axis for example. It should be understood that FIGS. 2 and 3 are views taken from above, for example with the horizontal plane running parallel to the plane of the drawing such that the recesses 16 and 17 are shown located above the horizontal plane that runs through the cylinder axis.

Figure 5:
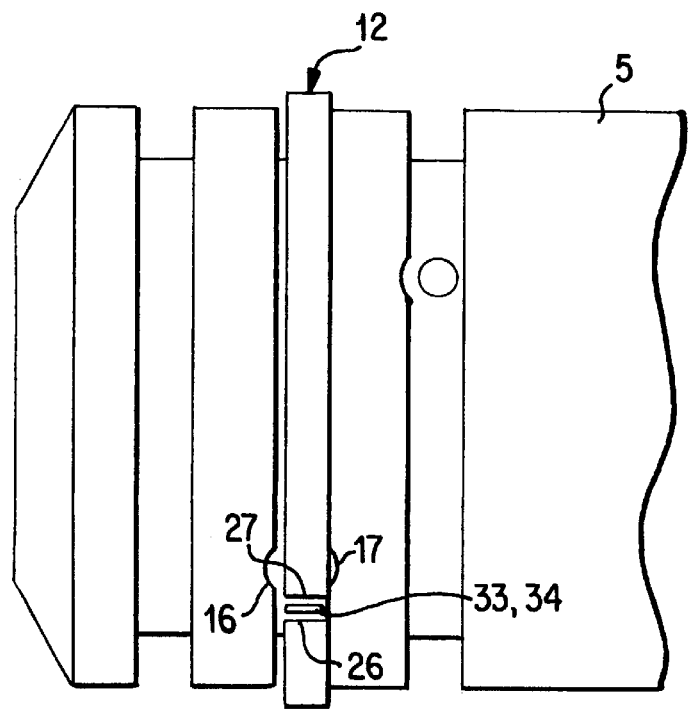
FIG. 5 is a schematic view of a piston ring secured against twisting.

Flow of lubricant into the combustion chamber can also be effectively prevented if the middle piston ring in particular is secured against twisting in such fashion that the ring faces (i.e., the end faces of the piston ring defining a small circumferential gap in the piston ring to enable assembly) are likewise secured in an area of the cylinder that is located higher up, so that very little lubricant if any can pass through the open ring face gap. Protection against twisting in this manner can be provided for example by a known ring face protector, for example as shown in FIG. 5, in which a thin pin 33 is pressed radially between two adjacent ring faces 26, 27 into a matching bore 34 at the bottom of the ring groove. This pin can be located in particular in the vicinity of one of the recesses.

Figure 3:
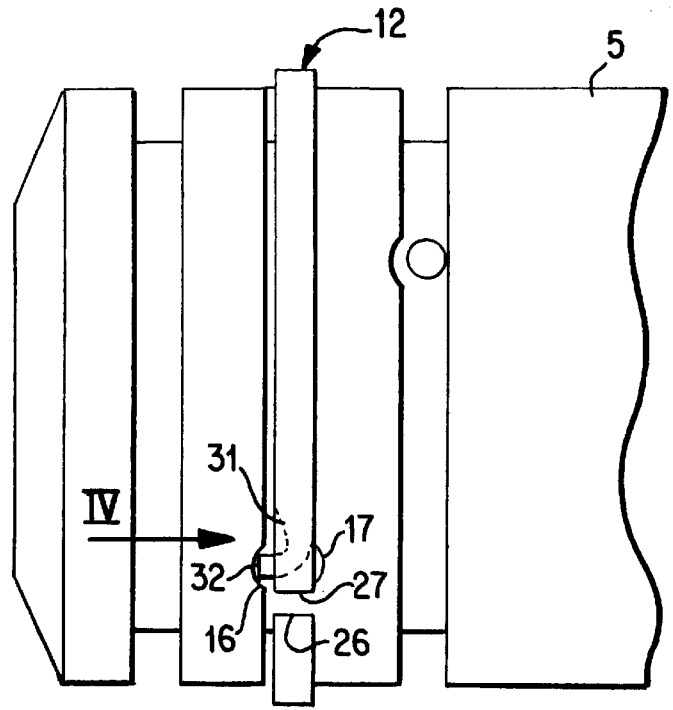
FIG. 3 is a schematic top view of a piston with a piston ring secured against twisting.
Figure 4:
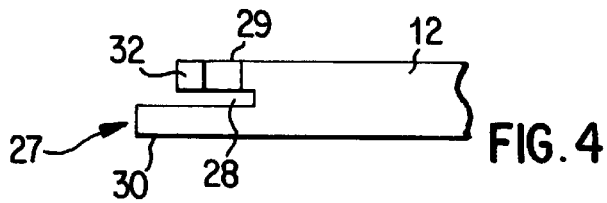
FIG. 4 is a partial view of the piston ring as viewed in the direction of arrow IV in FIG. 3.

FIGS. 3 and 4 show another embodiment of the anti-twist protector for the piston ring, said embodiment eliminating a pin and therefore being much simpler to produce during assembly. The middle piston ring 12 shown in FIG. 3 is provided for this purpose with a cut 28 located approximately centrally in one of the two ring faces 26 and 27, said cut forming inner and outer ring face sections 29 and 30 respectively. Inner ring face section 29 is provided with a flattened portion 31 at one end i.e., having a reduced height relative to the rest of the ring. The flattened portion 31 of the inner ring face section is bent at approximately 90 degrees such that the free end 32 projects into recess 16. The piston ring is prevented from twisting by the free end 32 of the inner ring face section that projects into the recess. Flattened portion 31 can be produced by grinding for example. This local reduction in the height of the ring facilitates flexing and/or bending. As a result, even one-piece and especially thick-walled piston rings can be shaped accordingly without there being an increase in the danger of breakage during the bending process or during engine operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   at least one cylinder having a cylinder axis extending at least approximately horizontally in the installed position,
   a piston defining at least three annular grooves along an outer circumference and defining an interior chamber;
   a piston ring disposed in each of the annular grooves, respectively, each piston ring having an at least approximately rectangular cross section,
   annular chambers being defined between the piston and the cylinder between adjacent ones of the piston rings,
   recesses being defined in the piston adjacent at least two of the annular grooves, each said recess extending between a bottom of the respective annular groove and the outer circumference of the piston and communicating with one of said annular chambers,
   at least one bore defined in the piston between the bottom of the annular groove located remote from a combustion chamber and the interior chamber of the piston,
   the annular groove closest to the combustion chamber being free of recesses,
   an axial play between the annular groove closest to the combustion chamber and the piston ring disposed therein being at least 50 μm.

2. An internal combustion engine according to claim 1, wherein the bore is located in the annular groove located furthest from the combustion chamber, and the bore makes a transition to a recess.

3. An internal combustion engine according to claim 2, wherein the bore is formed on a side of the annular groove that is remote from the combustion chamber.

4. An internal combustion engine according to claim 3, wherein the bore is located opposite one of said recesses located adjacent a side of annular groove located toward the combustion chamber.

5. An internal combustion engine according to claim 1, wherein the piston has three annular grooves, the recesses being formed in a middle of the three annular grooves on both a side located toward the combustion chamber and a side located away from the combustion chamber.

6. An internal combustion engine according to claim 5, wherein the recesses are located facing one another.

7. An internal combustion engine according to claim 1, wherein at least one of the piston rings is protected against twisting by a ring face protector.

8. An internal combustion engine according to claim 7, wherein the ring face protector is made in the form of a pin located between opposing end faces of the piston ring, said pin being inserted into a radial bore at the bottom of the annular groove.

9. An internal combustion engine according to claim 8, wherein the radial bore makes a transition to a recess to receive the pin.

10. An internal combustion engine according to claim 7, wherein the ring face protector is made in the form of a bent section at one of the ring faces of the piston ring, the bent section projecting into one of said recesses at the respective annular groove.

11. An internal combustion engine according to claim 10, wherein said one of the ring faces is provided with a cut that extends approximately centrally and tangentially, said cut defining inner and outer ring face sections, one of the ring face sections being bent at an angle to form said bent section.

12. An internal combustion engine according to claim 11, wherein the inner ring face section is bent axially.

13. An internal combustion engine according to claim 11, wherein the bent ring face section has a reduced ring height in the vicinity of the bend.

14. An internal combustion engine according to claim 11, wherein said axial play between the annular groove closest to the combustion chamber and the piston ring disposed therein is less than or equal to 120 μm.

15. A piston for a horizontal cylinder of an internal combustion engine, said piston comprising:
    a piston bottom to be faced to a combustion chamber of the engine;
    a piston body integral with said piston bottom and extending in an axial direction from said piston bottom, an interior of said piston body and said piston bottom defining an interior chamber;
    at least three annular grooves being defined in said piston body extending circumferentially around the piston,
    a first of said annular grooves located nearest said piston bottom having a constant cross-section in said axial direction throughout, said first annular groove being dimensioned to receive a piston ring with an axial play between the piston ring and the first annular groove of at least 50 μm,
    a second and a third of said annular grooves located further from said piston bottom having a cross-section which varies in said axial direction at recesses extending from an outer circumference of said piston to a bottom of said annular grooves,
    at least one bore defined in the piston communicating the annular groove located furthest from the piston bottom with the interior chamber.

16. A piston according to claim 15, further comprising a ring face protector comprising a radial bore at the bottom of one of the annular grooves and a pin to be inserted into said radial bore, said pin to be located between opposing end faces of a piston ring disposed in said one of the annular grooves.

17. A piston according to claim 16, wherein the radial bore makes a transition to a recess to receive the pin.

18. A piston according to claim 15, further comprising a piston ring disposed in said second or third annular groove, said piston ring including a pair of ring faces and a bent section at one of the ring faces, the bent section projecting into one of said recesses to form a ring face protector.

19. An internal combustion engine according to claim 18, wherein said one of the ring faces is provided with a cut that extends approximately centrally and tangentially, said cut defining inner and outer ring face sections, one of the ring face sections being bent at an angle to form said bent section.

20. A piston according to claim 15, wherein said first annular groove is dimensioned to receive a piston ring with said axial play between the piston ring and the first annular groove being less than or equal to 120 μm.

* * * * *